United States Patent
Op De Beeck et al.

(10) Patent No.: US 11,940,422 B2
(45) Date of Patent: *Mar. 26, 2024

(54) MICROFLUIDIC DEVICE

(71) Applicant: PHARMAFLUIDICS NV, Ghent (BE)

(72) Inventors: Jeff Op De Beeck, Mariakerke (BE); Paul Jacobs, Lokeren (BE); Wim De Malsche, Berchem (BE)

(*) Notice: Subject to any disclaimer, the term of this patent is extended or adjusted under 35 U.S.C. 154(b) by 423 days.

This patent is subject to a terminal disclaimer.

(21) Appl. No.: 16/917,246

(22) Filed: Jun. 30, 2020

(65) Prior Publication Data

US 2020/0333299 A1 Oct. 22, 2020

Related U.S. Application Data

(63) Continuation-in-part of application No. 15/742,652, filed as application No. PCT/EP2016/066461 on Jul. 12, 2016, now Pat. No. 10,697,942.

(30) Foreign Application Priority Data

Jul. 12, 2015 (BE) .................................. 2015/5441

(51) Int. Cl.
*G01N 30/06* (2006.01)
*B01L 3/00* (2006.01)

(52) U.S. Cl.
CPC ........ *G01N 30/06* (2013.01); *B01L 3/502715* (2013.01); *B01L 2200/0631* (2013.01);
(Continued)

(58) Field of Classification Search
CPC ............... G01N 30/06; B01L 3/502715; B01L 2200/0631; B01L 2400/0475; B01L 2400/06; B01L 2400/082
See application file for complete search history.

(56) References Cited

U.S. PATENT DOCUMENTS 5,720,798 A 2/1998 Nickerson et al.
6,344,326 B1 * 2/2002 Nelson ............. G01N 27/44791
536/25.4
(Continued)

FOREIGN PATENT DOCUMENTS

CN 203935755 U * 11/2014 ............. G01N 30/40
EP 1867982 A2 12/2007
(Continued)

OTHER PUBLICATIONS

Belgium Search Report and Written Opinion from BE Application No. 2015/05441, dated Mar. 22, 2016.
(Continued)

*Primary Examiner* — John Fitzgerald

(57) ABSTRACT

A microfluidic device for analysing a specimen comprises a loading area for loading the specimen of interest and an analytical column. The loading area is connected on two sides to a first duct and a second duct respectively, both integrated in the microfluidic device. The microfluidic device comprises a first integrated input connected to the first duct to take the specimen into the loading area, a first integrated output connected to the second duct to discharge the rest of the specimen, once it has flown through the loading area, and a second integrated output downstream the analytical column. The first integrated output is arranged for during a first loading period of time being in circuit connected to the first integrated input so as to load the sample into the loading zone of the device while preventing loss of specimen during loading of the sample into the analytical column.

18 Claims, 15 Drawing Sheets

(52) U.S. Cl.
CPC ... *B01L 2400/0475* (2013.01); *B01L 2400/06* (2013.01); *B01L 2400/082* (2013.01); *G01N 2030/065* (2013.01)

(56) References Cited

U.S. PATENT DOCUMENTS

| | | | |
|---|---|---|---|
| 6,939,452 B2* | 9/2005 | Foret | B01L 3/502715 204/601 |
| 7,556,731 B2* | 7/2009 | Iwata | B01D 15/166 210/659 |
| 7,802,591 B2 | 9/2010 | Barrow et al. | |
| 7,958,774 B2* | 6/2011 | Brand | G01N 30/40 73/61.55 |
| 7,972,561 B2 | 7/2011 | Viovy et al. | |
| 8,562,918 B2 | 10/2013 | Jovanovich et al. | |
| 8,794,053 B2* | 8/2014 | Tipler | G01N 30/62 73/61.56 |
| 9,012,236 B2 | 4/2015 | Jovanovich et al. | |
| 9,663,819 B2 | 5/2017 | Jovanovich et al. | |
| 9,664,598 B2* | 5/2017 | Walsh | G01N 1/22 |
| 9,679,757 B2* | 6/2017 | Netto | G01N 30/463 |
| 10,309,939 B2 | 6/2019 | Tipler | |
| 10,697,942 B2* | 6/2020 | Op De Beeck | G01N 30/08 |
| 2003/0057092 A1* | 3/2003 | Chien | B01L 3/502753 205/687 |
| 2003/0175165 A1* | 9/2003 | Liu | B01L 3/502746 422/502 |
| 2003/0224436 A1* | 12/2003 | Nelson | G01N 33/569 435/6.12 |
| 2004/0031686 A1* | 2/2004 | Foret | G01N 27/44791 204/644 |
| 2004/0055956 A1 | 3/2004 | Harrold | |
| 2004/0149568 A1* | 8/2004 | Huang | B01L 3/502753 204/193 |
| 2006/0108012 A1 | 5/2006 | Barrow et al. | |
| 2007/0017868 A1* | 1/2007 | Grimm | G01N 30/08 422/69 |
| 2009/0165873 A1 | 7/2009 | Chordia et al. | |
| 2012/0118049 A1* | 5/2012 | Tipler | G01N 30/62 73/61.56 |
| 2013/0240449 A1* | 9/2013 | Collier | G01N 30/04 210/656 |
| 2014/0345372 A1 | 11/2014 | Gerhardt et al. | |
| 2015/0021502 A1 | 1/2015 | Vangbo | |
| 2015/0136602 A1 | 5/2015 | Jovanovich et al. | |
| 2016/0003784 A1* | 1/2016 | Fujita | B01D 15/10 210/198.2 |
| 2016/0305919 A1* | 10/2016 | Staples | B01D 15/325 |
| 2017/0102366 A1 | 4/2017 | Tipler | |
| 2019/0234915 A1 | 8/2019 | Gerhardt et al. | |

FOREIGN PATENT DOCUMENTS

| | | |
|---|---|---|
| JP | 2005-257459 A | 9/2005 |
| JP | 2007-132686 A | 5/2007 |
| JP | 2008-209334 A | 9/2008 |
| JP | 2015-515383 A | 5/2015 |
| WO | 98/17998 A1 | 4/1998 |

OTHER PUBLICATIONS

International Search Report and Written Opinion from PCT Application No. PCT/EP2016/066461, dated Oct. 12, 2016.
Japanese Office Action from JP Application No. 2018500926, dated Mar. 30, 2020.

* cited by examiner

MICROFLUIDIC DEVICE

FIELD OF THE INVENTION

The present invention relates to the field of separating liquid phases. More particularly, the present invention relates to microfluidic systems having a particular configuration for separating liquid phases, to be used for example for chromatography.

BACKGROUND OF THE INVENTION

Chemical reactor systems that make use of liquid propagation have a large number of applications, including production of chemical components, synthesis of nano-particles, separation and/or extraction of components, etc.

In separation techniques based on liquid propagation, use is typically made of the difference in affinity of various substances with a mobile phase and a stationary phase and/or of the difference in partition coefficients for partitioning of components. As each substance has its own "bonding power" to the stationary phase, they will be moved along faster or slower with the mobile phase and as such, certain substances can be separated from others. In principle, it is applicable to any composition, having the advantage that no evaporation of the material is required and that variations in temperature only have a negligible effect.

A specific example of a separation technique for separating mixtures is chromatography, for example in order to be able to analyse these accurately. A large variety of types of chromatography exists, such as gas chromatography, gel chromatography, thin-layer chromatography, adsorption chromatography, affinity chromatography, liquid chromatography, etc.

During liquid chromatography, a phase that is interesting for analysing is typically captured from the mixture first, to then be able to take it to a detector or inject it into an analysing column. Capturing the phase of interest typically happens in a trapping column, in which use is made of the difference in affinity of various substances with a mobile phase and a stationary phase and/or the difference in partition coefficients for partitioning of a mixture in its components.

As analysis often needs to happen on small quantities of specimen, it is important that when the specimen flows through the device, all useful parts of specimen are handled as efficiently as possible, and without loss. In a traditional device, the various components in the system, such as for example the trapping column and the analytical column, are typically coupled together using connectors and valves. Switching these valves then allows to control the liquid flow during the various actions such as loading of the specimen, separating of liquid phases of the specimen and injecting of the separated phase of interest to a detector or analytical column. However, due to their position in the specific configuration of devices in the state of the art, these valves and connectors often also have the disadvantage that a part of the specimen stays behind in dead volumes of or introduced by the valves. This may not only have a negative effect on the amount of specimen available but may also lead to contamination of the various separated phases, causing separation to happen less efficiently. In addition, in the traditional arrangement, these dead volumes introduce a significant plug broadening during the injection step causing the analytical separation to be negatively affected. The smaller the volumes used or worked in, the larger the impact will be.

In other words, there is room for improvement.

SUMMARY OF THE INVENTION

It is an object of the present invention to provide good microfluidic systems and methods for separating liquid phases.

It is an advantage of embodiments of the present invention that a microfluidic device is provided whereby the various connectors are integrated at microfluidic level.

It is an advantage of embodiments of the present invention that a microfluidic device is provided that may be connected into a valve circuit so that, during operation, it is not influenced by the volume of the connections and the valves.

It is an advantage of embodiments of the present invention that the microfluidic device may be flowed through with a flow speed which may be in the micro-litres per minute range as well as in the nano-litres per minute range.

The above object may be achieved by a device according the present invention.

The present invention relates to a microfluidic device for analysing a specimen or sample, the microfluidic device comprising a loading or trapping area for loading the specimen of interest and an analytical column whereby the loading area is connected on two sides to a first duct and a second duct respectively, both integrated in the microfluidic device, and whereby the microfluidic device further comprises a first integrated output connected to the second duct to discharge a portion of the specimen, once it has flowed through the loading area has a second integrated output downstream the analytical column, characterized in that the first integrated output is arranged for during a first loading period of time being in circuit connected to the first duct so as to load the sample into the loading or trapping area of the device while preventing loss of specimen during loading of the sample into the loading area. As use herein the term "loading area", "loading zone", and "trapping area" are used interchangeably. As used herein the term "specimen" and "sample" are used interchangeably.

The device furthermore may be arranged for during a second period of time, having the first integrated output being connected to a blind stop and having the first duct being connected in circuit to the second integrated output so as to drive the sample from the loading area into the analytical column thus preventing loss of specimen via the first integrated output during the analytical separation of the sample in the analytical column.

The loading area may comprise one or more channels or lanes and wherein the analytical column comprises a plurality of channels. As used herein the term "channel" and "lanes" are used interchangeably.

The plurality of channels of the analytical column may be channels oriented substantially parallel to each other.

The one or more channels of the loading area may be a plurality of channels being oriented substantially parallel to each other.

One or more of the channels of the loading area may have a larger width than the channels of the analytical column.

The second integrated output being connected to a spray tip.

The device may be configured to elute a separated phase to a detector or an analytical column and the device is connectable to a pump to be able to pump the separated phase to the detector or the analytical column.

A linear flow velocity in the system may be controllable by a pump system.

A linear flow velocity may be controllable by a pump system and by taking into account the intrinsic fluid characteristics of the device.

The device may comprise a pump system comprising a pump for loading the specimen via the first integrated input and an analytical pump for pumping the phase to the analytical column.

The device may be arranged for receiving the sample in the loading area at a flow rate in the range 0.1 µl to 1000 µl.

The device may be arranged for receiving the sample in the analytical column at a flow rate in the range 0.1 µl to 1000 µl.

The device may be arranged for providing a flow rate during loading in the loading zone at least 2 times, preferably at least 5 times, even more preferably at least 10 times the flow rate during the analytical separation cycle.

External connections to inputs and outputs may be implemented by at least one six-way valve.

External connections to the inputs and outputs may be implemented using at least a valve with more than 6 ports.

External connection to inputs and outputs may be implemented by at least one ten-way valve.

The device may comprise a waste collector 1004 for collecting the specimen portion discharged is the first integrated output and a coupling to the analytical column.

The present invention also relates to a chromatography system, whereby the system comprises a microfluidic device as described above.

The present invention also relates to the use of a microfluidic device as a stationary phase in chromatography procedure.

The present invention also relates to a method for operating a microfluidic device (100) for separating a phase in a specimen as described above, the method comprising loading the specimen into the loading area, discharge the rest of the specimen, once it has flown through the loading area, while preventing loss of specimen during loading of the sample into the analytical column guiding the specimen of interest to the analytical column of the device so as to load the sample into the analytical column of the device.

Guiding the specimen of interest to the analytical column may comprise preventing loss of specimen via the first integrated output.

The method also may comprise controlling of a pump system so as to vary the flow velocity between a velocity during loading in the loading area and a velocity during said loading into the analytical column.

It is an advantage of embodiments of the present invention that the valves, used for controlling the liquid flow for various actions when using the device (loading the specimen, separating the phases, injecting the phase of interest), may be positioned in the configuration so that they generate only a minimal or even no dead volume for the specimen being studied.

It is an advantage of embodiments of the present invention that the chance of blockages in the connection circuit due to small particles, aggregates or macro-molecules accumulating, may be reduced or even prevented.

It is an advantage of embodiments of the present invention that the microfluidic device may be flowed through bidirectionally without risk of leaking of the stationary phase.

It is an advantage of embodiments of the present invention that the microfluidic device may be flowed through bidirectionally whereby the flow speed may be in the micro-litres per minute range as well as in the nano-litres per minute range.

It is an advantage of embodiments of the present invention that the microfluidic device filled with stationary phase may be flowed through via at least two inputs.

The present invention relates in one aspect to a microfluidic device for separating a phase in a specimen, the microfluidic device comprising a microfluidic trapping area for capturing the phase of interest, whereby the microfluidic trapping area is connected on two sides to a first duct and a second duct respectively, both integrated into the microfluidic device, and whereby the microfluidic device further has a first integrated input connected to the first duct to take the specimen into the trapping area to separate the phase of interest, has a first integrated output connected to the second duct, to discharge the rest of the specimen, once it has flowed through the trapping area has a second integrated output connected to a selected duct selected from the first duct or the second duct, to elute the separated phase out of the device via this output, has a second integrated input connected to a first duct or a second duct that is not the selected duct, to connect to a pump to be able to pump the separated phase out of the device, and has a third integrated input, also connected to the selected duct via a connection located between the connection of the second integrated output on the selected duct and the microfluidic trapping area and via which the liquid flow during separating of the phase and eluting of the phase may be controlled.

It is an advantage that the phase, when eluting to the detector or the analytical column, no longer needs to pass a valve. It is an advantage of the invention that blockage due to accumulation of small particles (i.e. phase) in the device is avoided. It is an advantage of the invention that dead volumes which occur when using valves, are avoided. This is certainly relevant in the case of small volumes.

The third integrated input may, when the microfluidic device is in operation and during separating of the phase of interest, be configured to generate a counter-pressure in the selected duct so that no flow is possible to the second integrated output.

It is an advantage of embodiments of the present invention that leaking of the specimen to the analytical column during loading and separating may be prevented.

The third integrated input may, when the microfluidic device is in operation and during eluting of the phase of interest, be connected in a circuit with the first integrated input when the third integrated input is in the first duct or to the first integrated output when the third integrated input is in the second duct, thus preventing loss of sample via the first integrated input or via the first integrated output respectively during eluting.

The second integrated output may be connected to the first duct, and the microfluidic device may be configured so that, when in operation, the flow direction during separating and injecting is opposite. It is an advantage of the present invention that the microfluidic device allows bidirectional flow directions.

The second integrated output may be connected to the second duct, and the microfluidic device may be configured so that, when in operation, the flow direction during separating and eluting is the same.

The microfluidic device may have a fourth integrated input connected to the non-selected duct. Furthermore, the system may yet have additional inputs and/or outputs and further inputs may be provided to control the flow in the additional inputs and/or outputs.

The second integrated output may be configured to elute the separated phase via this output to a detector or an analytical column and the second integrated input may be connected to an analytical pump to be able to pump the separated phase to the detector or the analytical column.

At least the first and second integrated inputs may be adapted to connect to a pump system.

The linear flow velocity (S1, S2) may be controllable by the pump system.

The linear flow velocity (S1, S2) may be controllable by the pump system and by taking into account the intrinsic fluid characteristics of the device.

External connections for the inputs and outputs may be implemented by means of at least two six-way valves or valves with more than six ways.

External connections for the inputs and outputs may be implemented by means of at least one ten-way valve.

The device may be provided with a pillar structure, a monolithic phase or a packed material adapted to capture the phase.

The device may comprise a pump for loading the specimen via the first integrated input, may comprise a waste collector for collecting the specimen rest discharged via the first integrated output, may comprise a coupling to the analytical column for pumping the phase to the analytical column via the second integrated input.

The present invention also relates to a chromatography system, whereby the system comprises a microfluidic device as described above.

The present invention also relates to the use of a microfluidic device as described above as a stationary phase in a chromatography procedure.

The present invention further also relates to a method for operating a microfluidic device for separating a phase in a specimen as described above, the method comprising trapping of a phase in the microfluidic trapping area by input via the first integrated input and an output via the first integrated output, whereby a counter-pressure is provided in the channel onto which the second integrated output is coupled to prevent eluting of the specimen, and eluting of the separated phase by pumping via the second integrated input to the second integrated output whereby loss of the separated phase via the first integrated input or the first integrated output is prevented by closing the first integrated input or the first integrated output in a circuit using the third integrated input.

It is an advantage of embodiments of the present invention that relaxation occurs in the transient pressure when switching from the separating phase to the eluting phase. Hereby, it is an advantage that the risk of loss of separated phase or disturbance of the system may be reduced.

The method may comprise controlling of a pump system connected to at least two inputs so that the device in operating mode is flowed through bidirectionally.

The method may comprise independently controlling of the speeds of the various flow directions (S1, S2).

Specific and preferable aspects of the invention have been included in the attached independent and dependent claims. Features of the dependent claims may be combined with features of the independent claims and with features of other dependent claims such as indicated and not only as expressly brought forward in the claims.

SHORT DESCRIPTION OF THE FIGURES

Figure 2A:
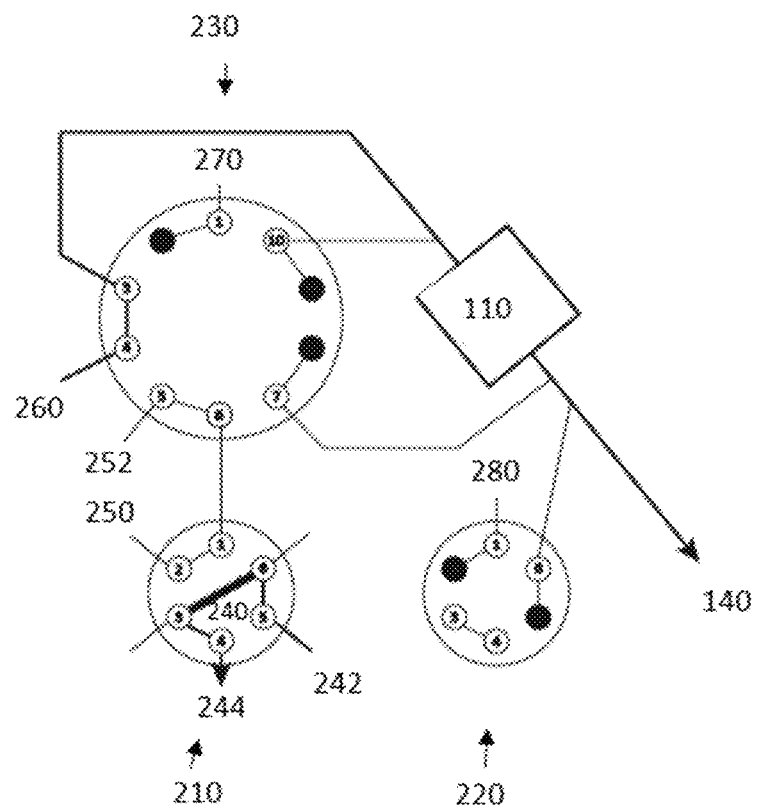
Figure 2B:
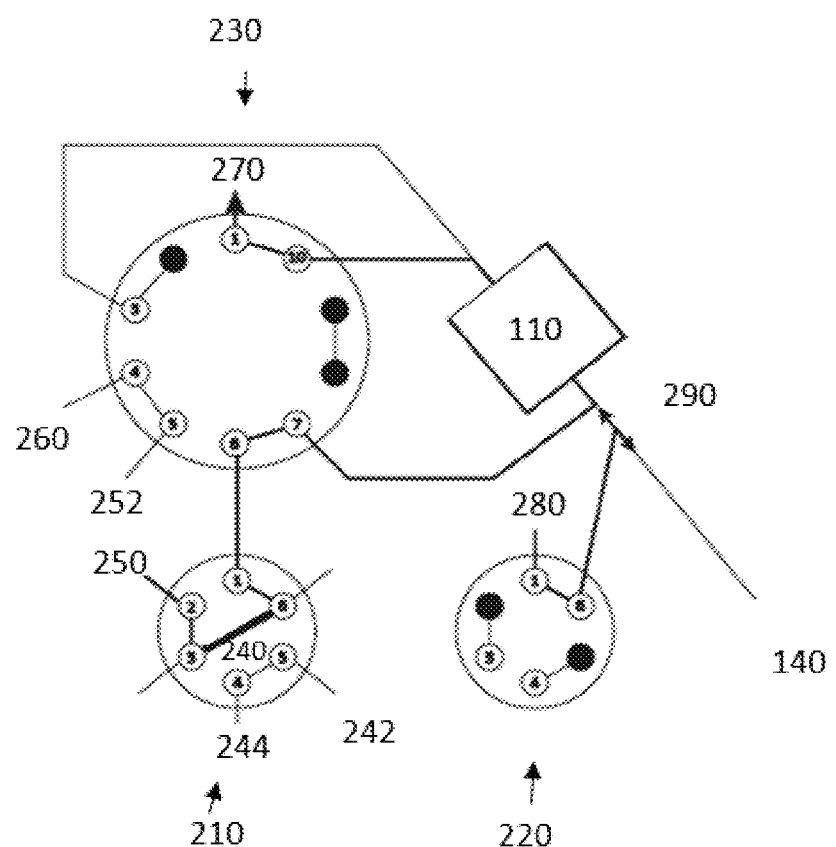
Figure 2C:
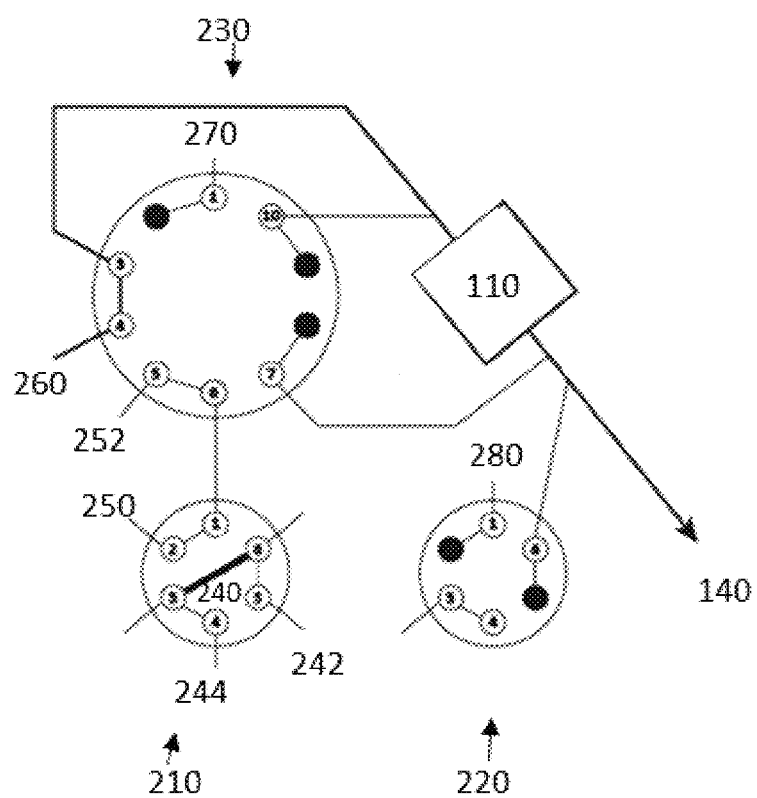

FIG. 2A to 2C illustrate a schematic representation of a first specific example of a microfluidic device using multiple-port valves according to one embodiment of the present invention, whereby FIG. 2A indicates the position of the valves during loading of the specimen, FIG. 2B indicates the position of the valves during separating of the stages and FIG. 2C indicates the position of the valves when injecting to a detector or into an analytical column.

Figure 3A:
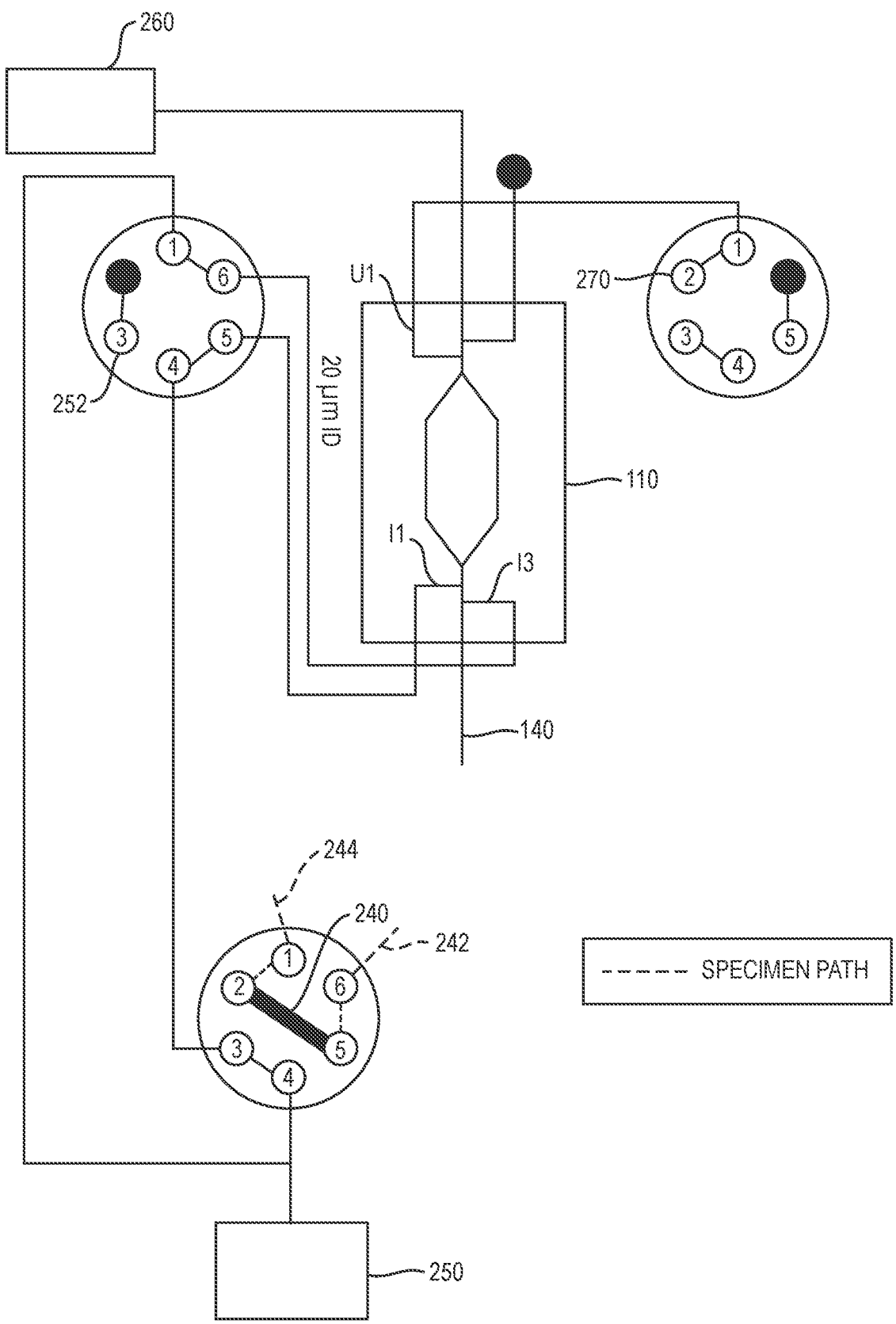
Figure 3B:
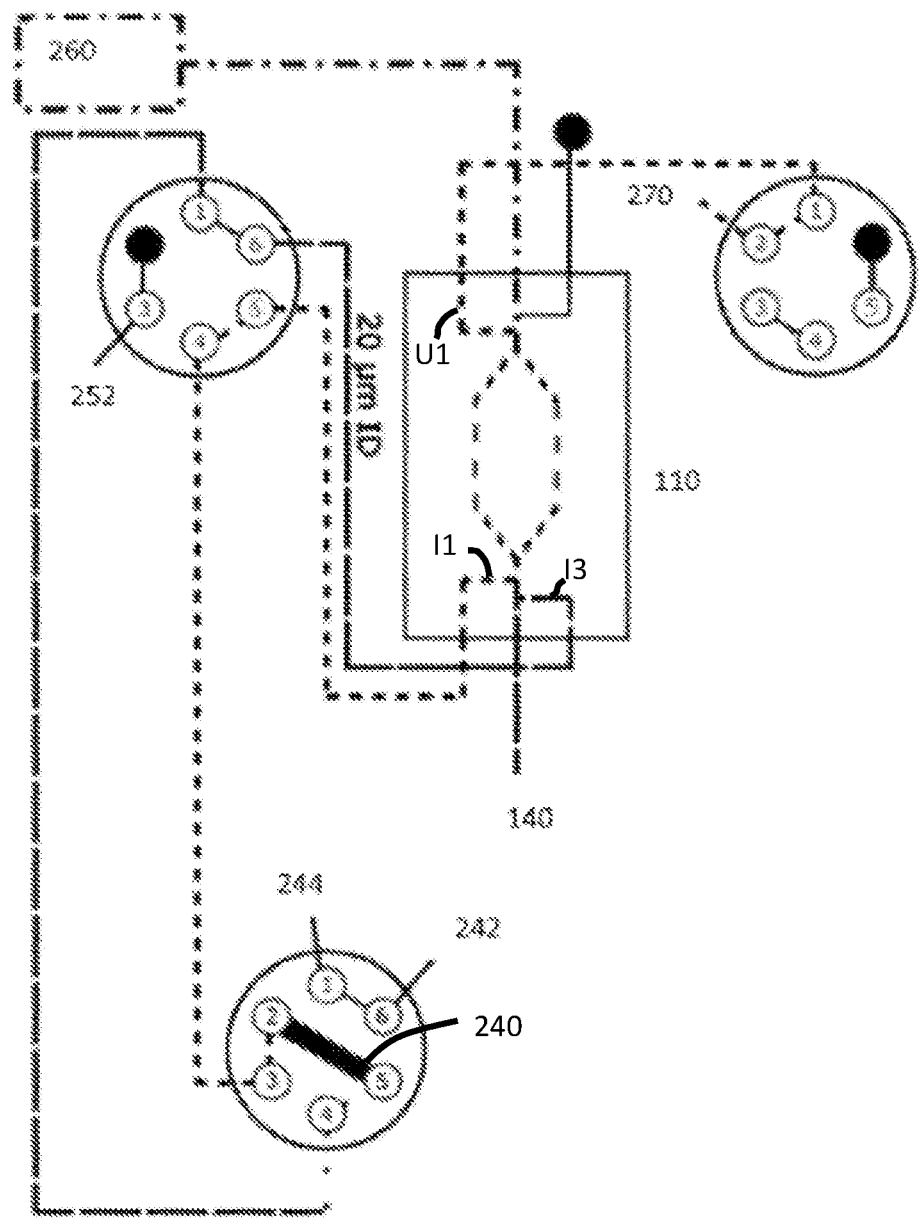
Figure 3C:
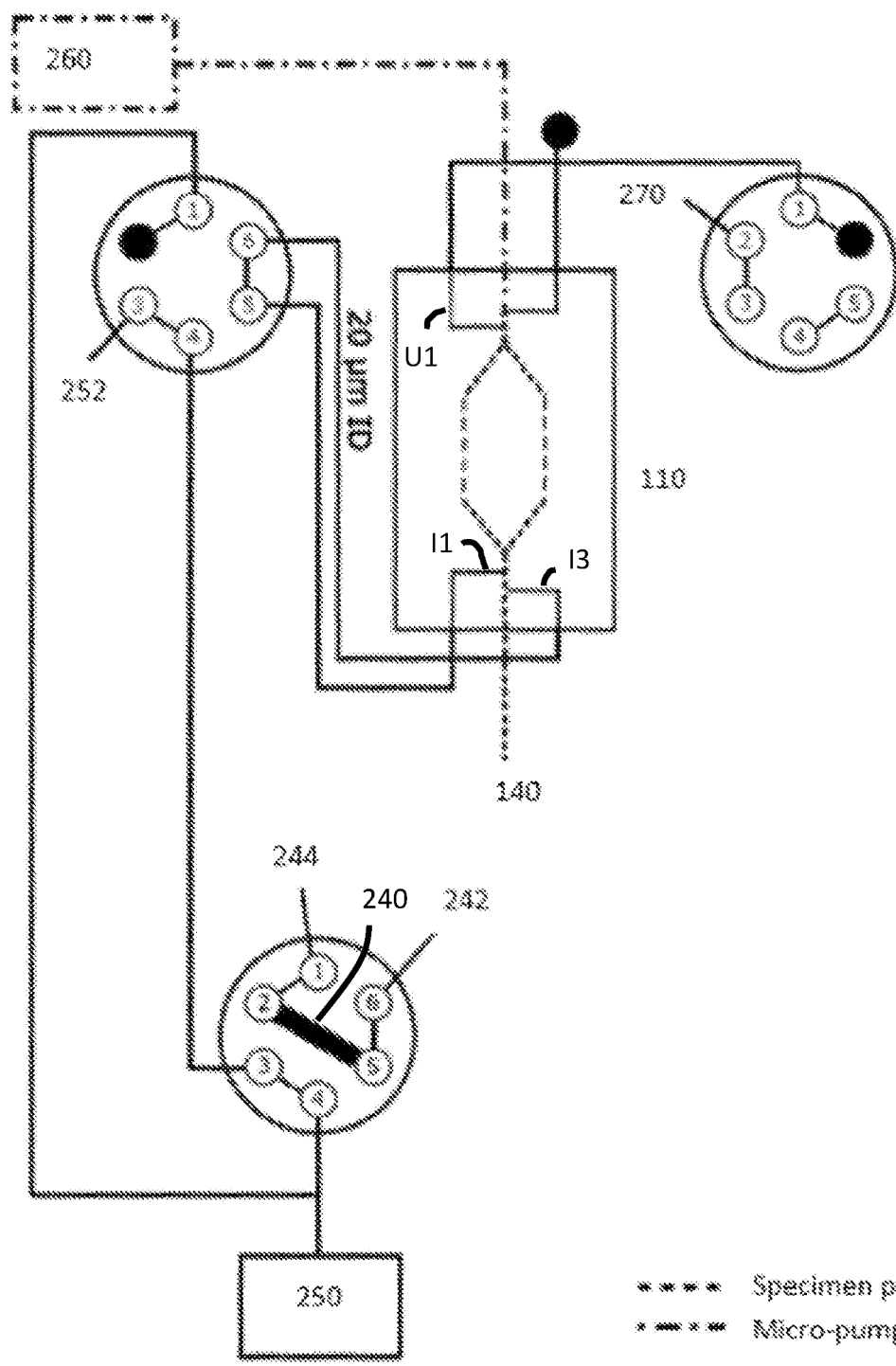

FIG. 3A to 3C illustrate a schematic representation of a second specific example of a microfluidic device using multiple-port valves according to one embodiment of the present invention, whereby FIG. 3A indicates the position of the valves during loading of the specimen, FIG. 3B indicates the position of the valves during separating of the stages and FIG. 3C indicates the position of the valves when injecting to a detector or into an analytical column.

Figure 4A:
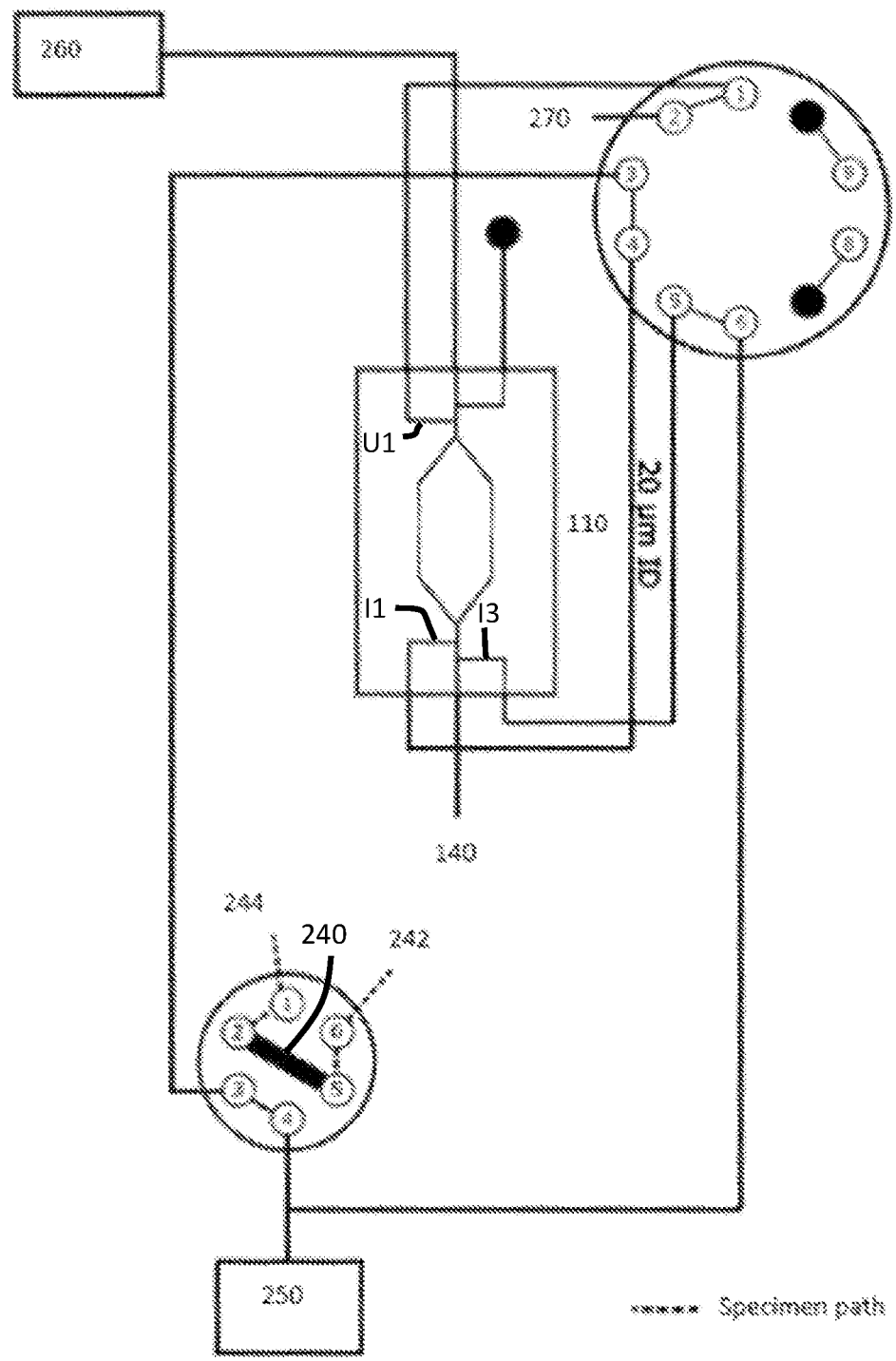
Figure 4B:
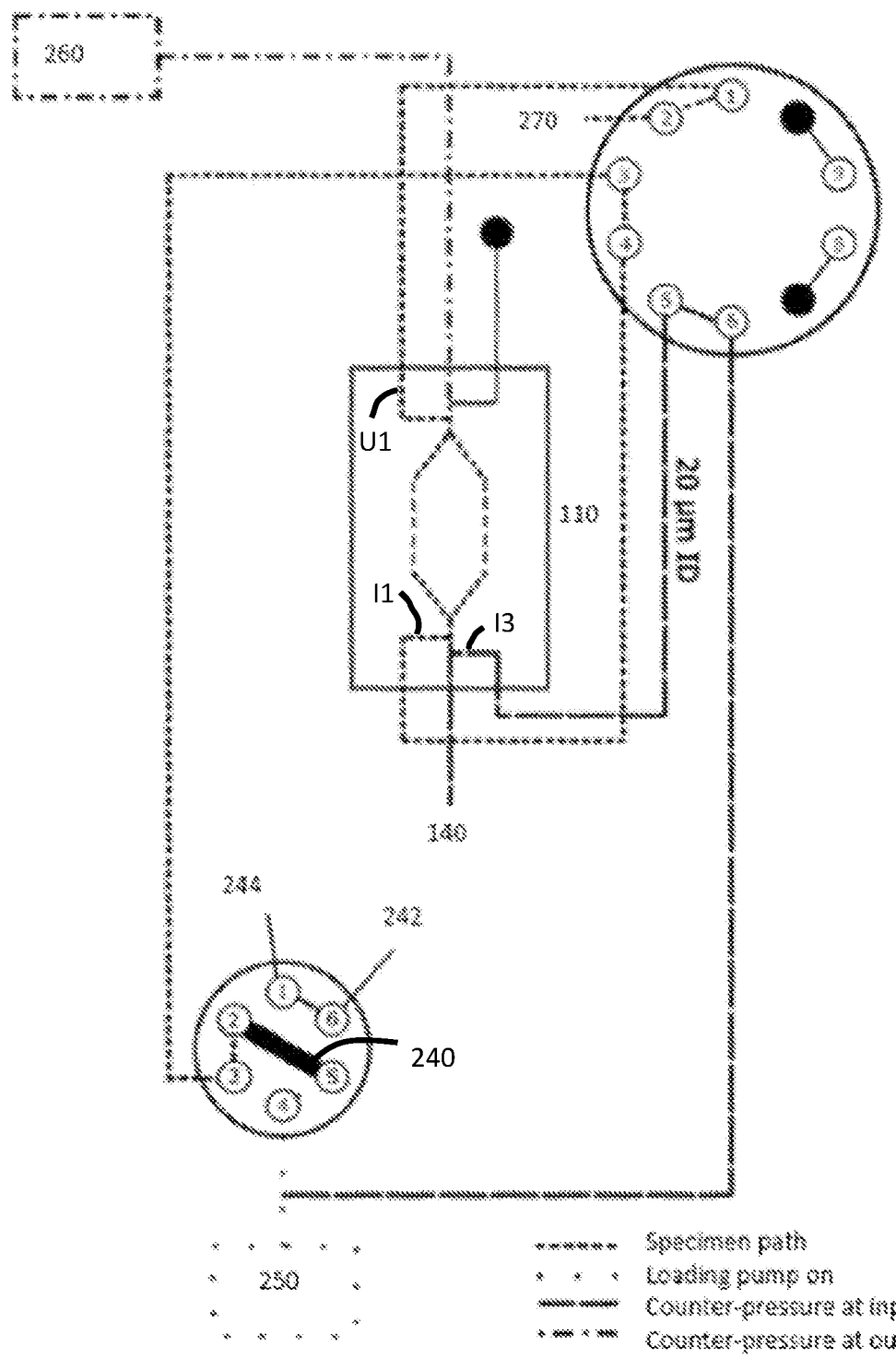
Figure 4C:
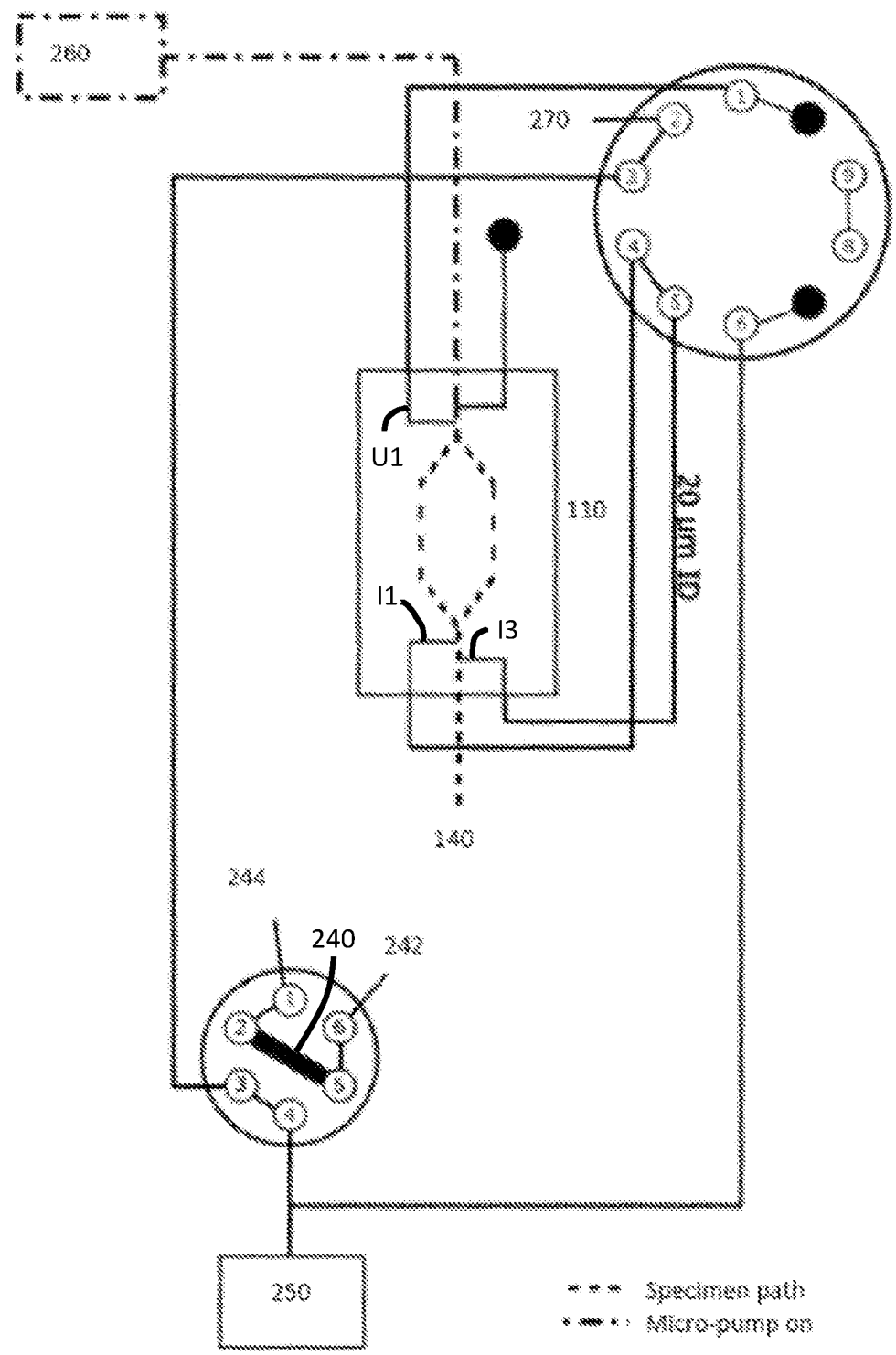

FIG. 4A to 4C illustrate a schematic representation of a third specific example of a microfluidic device using multiple-port valves according to one embodiment of the present invention, whereby FIG. 4A indicates the position of the valves during loading of the specimen, FIG. 4B indicates the position of the valves during separating of the stages and FIG. 4C indicates the position of the valves when injecting to a detector or into an analytical column.

FIG. 5 to FIG. 9 illustrates some examples showing embodiments of the present invention.

Figure 10A:
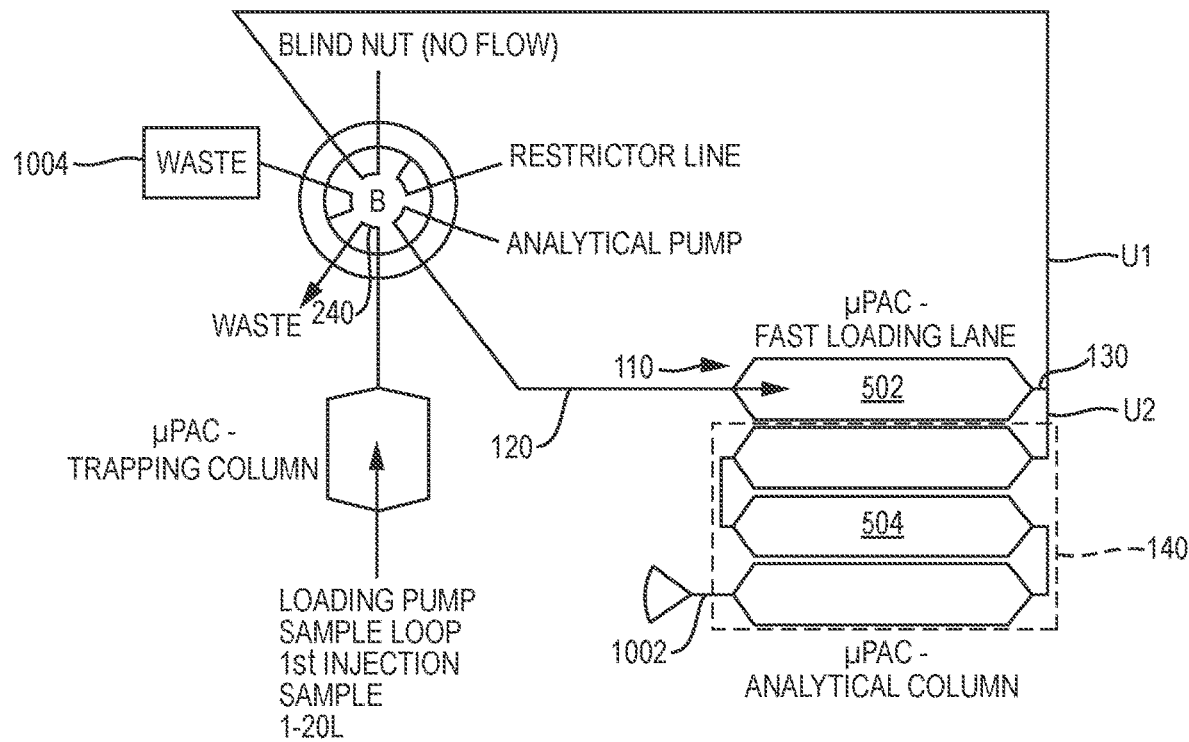
Figure 10B:
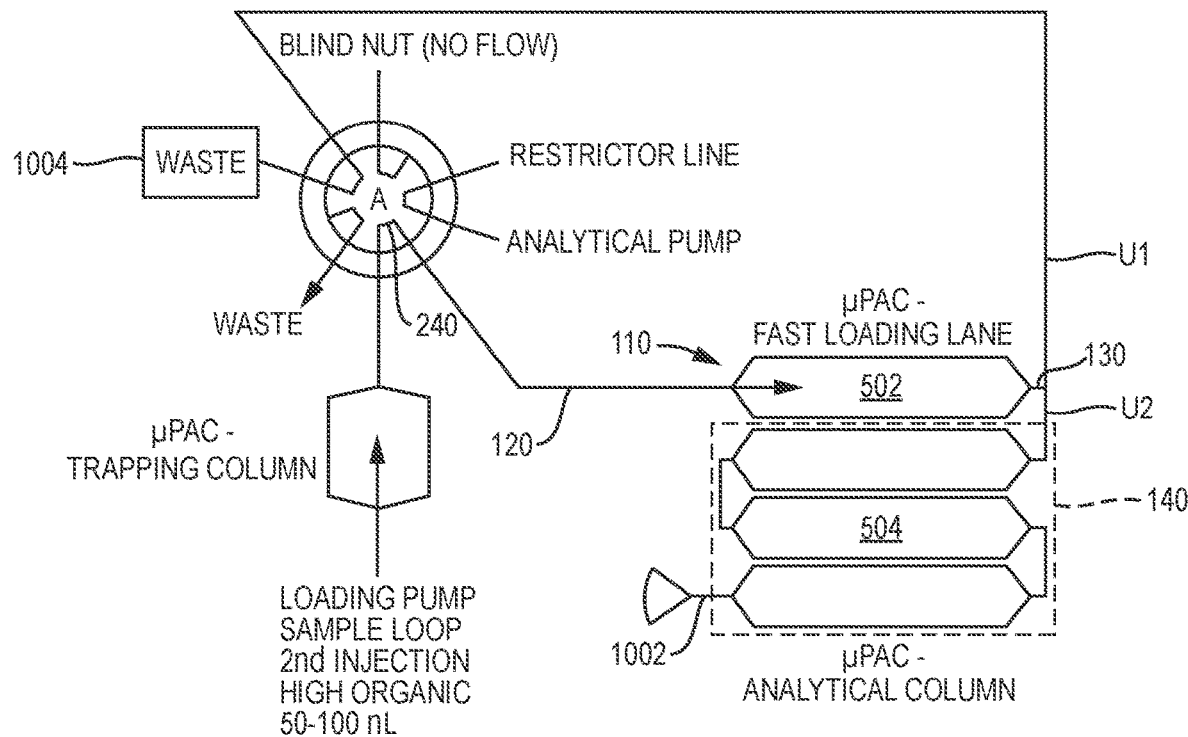
Figure 10C:
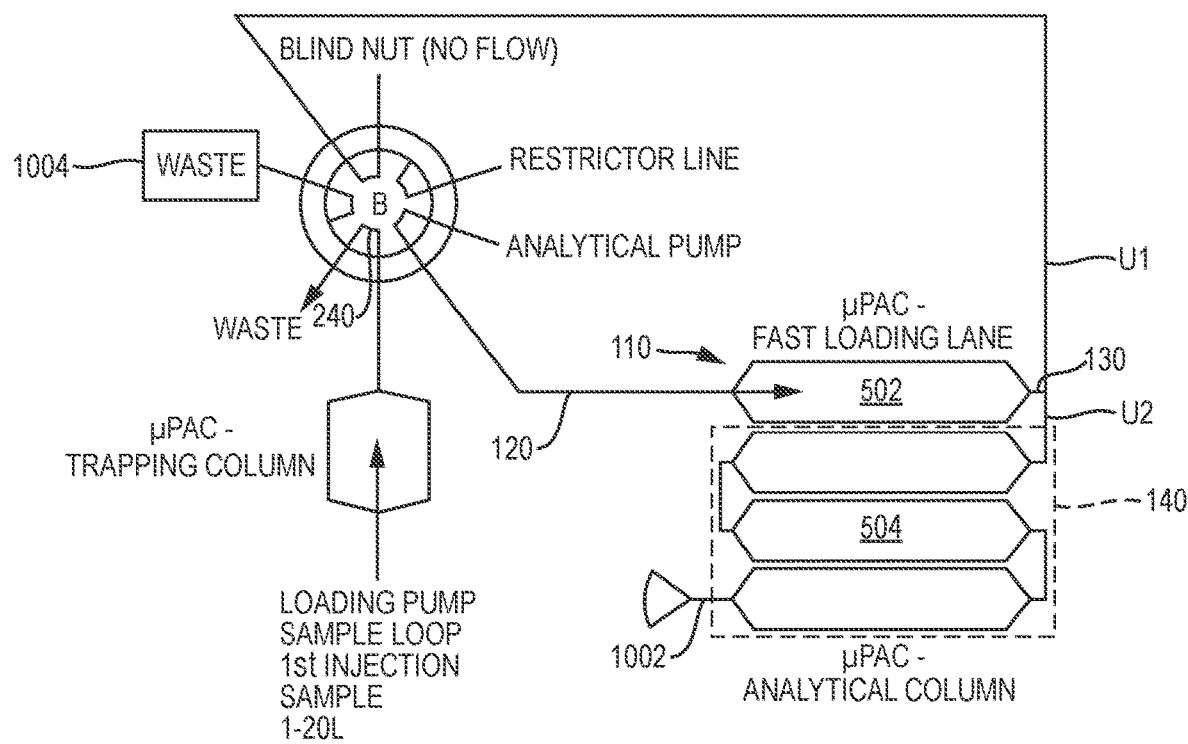

FIG. 10a to FIG. 10c illustrates different stages of handling a sample in a system according to the present invention.

Figure 11:
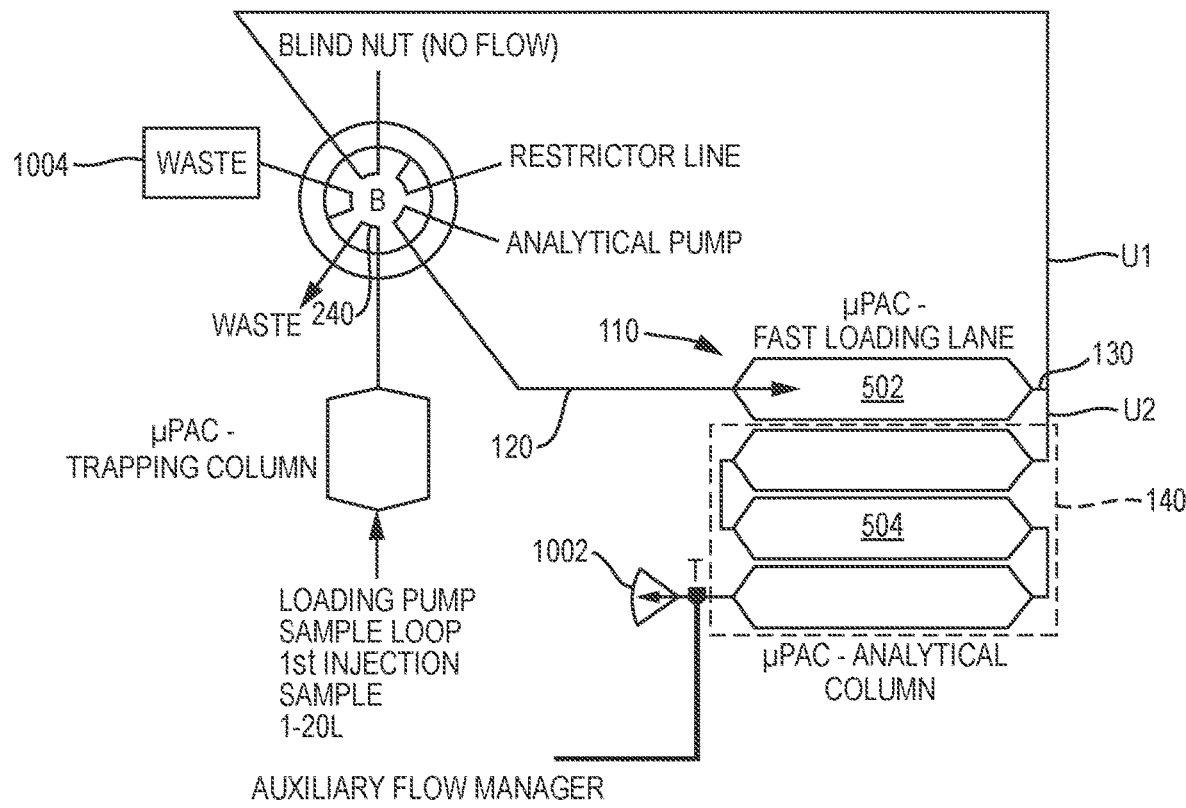
Figure 12:
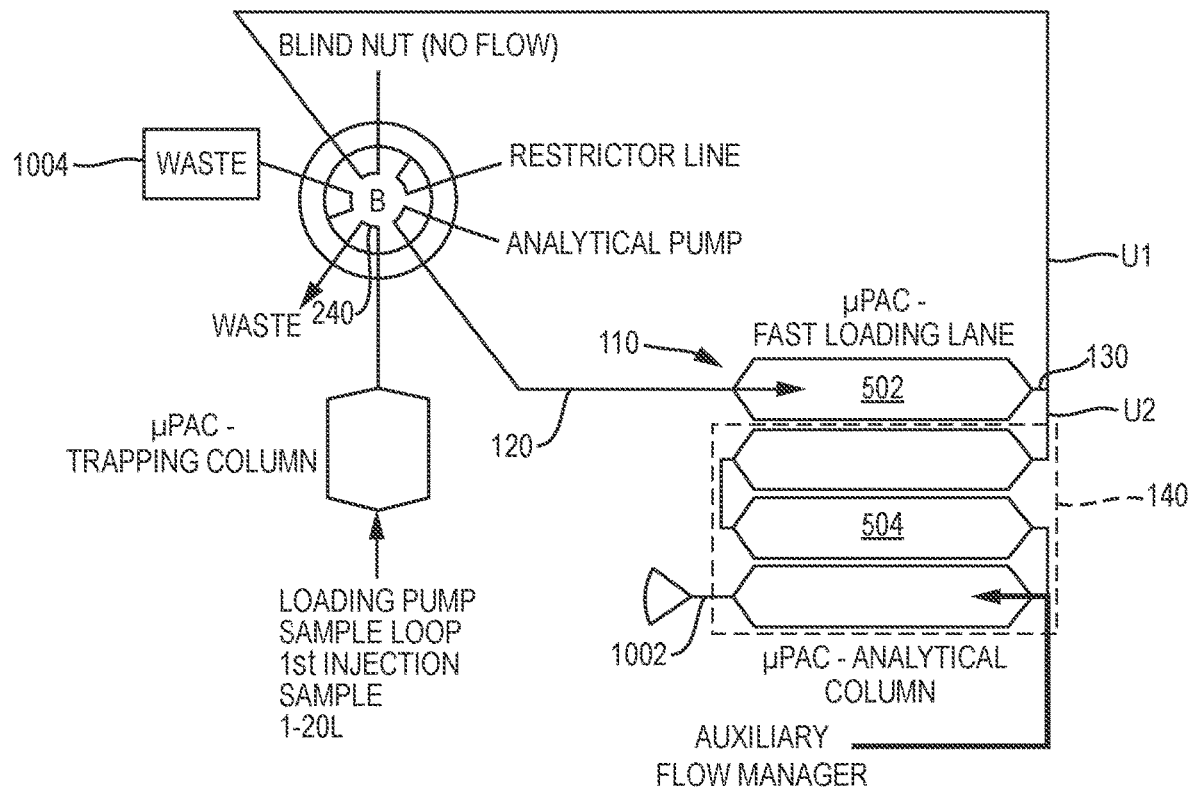

FIG. 11 and FIG. 12 illustrate further examples of systems according to embodiments of the present invention.

The figures are only schematic and not restrictive. The dimensions of some components may be exaggerated and are not represented to scale in the figures for illustrative purposes. Reference numbers used in the claims cannot be interpreted to restrict the scope of protection. In the various figures, the same reference numbers refer to the same or analogous elements.

DETAILED DESCRIPTION OF THE EMBODIMENTS

The present invention will be described in respect of specific embodiments and with reference to certain drawings, however the invention will not be restricted thereto but will only be limited by the claims.

Reference throughout this specification to "one embodiment" or "an embodiment" means that a specific feature, structure or characteristic described in connection with the embodiment has been included in at least one embodiment of the present invention. So, occurrence of the expressions "in one embodiment" or "in an embodiment" in various locations throughout this specification do not necessarily all need to refer to the same embodiment all the time, but may do so. Furthermore, the specific features, structures or characteristics may be combined in any suitable manner as would be clear to a person skilled in the art on the basis of this publication, in one or several embodiments.

Similarly, it should be appreciated that in the description of sample embodiments of the invention, various features of the invention are sometimes grouped together in one single embodiment, figure or description thereof intended to streamline the publication and to help the understanding of one or several of the various inventive aspects. This method of publication should therefore not be interpreted as a reflection of an intention that the invention requires more features than explicitly mentioned in each claim. Rather, as the following claims reflect, inventive aspects lie in fewer than all features of one single previously disclosed embodiment. So, the claims following the detailed description have been explicitly included in this detailed description, with every independent claim being a separate embodiment of the invention.

Furthermore, while some embodiments described herein contain some, but not other, features included in other embodiments, combinations of features from various embodiments are intended to be within the scope of the invention, and form these various embodiments as would be understood by the person skilled in the art. For example, in the following claims, any of the embodiments described may be used in any combination.

Furthermore, the terms first, second, third and the like in the description and in the claims are used to distinguish similar elements and are not necessarily used for describing an order, nor in time, nor in space, nor in ranking nor in any other manner. It should be understood that the terms used in this way are interchangeable in appropriate circumstances and that the embodiments of the invention described are suitable to work in a different order than described or indicated here.

Furthermore, the terms top, bottom, above, in front of and the like used in the description and the claims are used for description purposes and not necessarily to describe relative positions. It should be understood that the terms used as such are interchangeable in given circumstances and that the embodiments of the invention described herein are also suitable for functioning according to different orientations than described or indicated here.

It should be noted that the term "comprises", as used in the claims, should not be interpreted as being restricted to the items described thereafter; this term does not exclude any other elements or steps. It may be interpreted as specifying the presence of the features, values, steps or components indicated which are referred to but does not exclude the presence or addition of one or several other features, values, steps or components, or groups thereof. So, the extent of the expression "a device comprising items A and B" should not be restricted to devices consisting of components A and B only. It means that in respect of the present invention, A and B are the only relevant components of the device.

In the description provided here, a large number of specific details are disclosed. It may therefore be understood that embodiments of the invention may be embodied without these specific details. In other cases, well-known methods, structures and techniques are not shown in detail in order to keep this description clear.

Where in the present invention, reference is made to "integrated duct", "integrated input" or "integrated output", reference is made to a heterogeneous built-in duct, built-in input or built-in output in a monolithic microfluidic carrier, for example chip, on which the device is provided. Where in the present invention reference is made to a pump, reference is not only made to a hydraulic pump, but alternatively an array of pumps may be used such as for example pressure-driven pumps, peristaltic pumps, electro-osmotic pumps, piezoelectric pumps, injection pumps, etc.

Where in the present invention, reference is made to separating a phase, reference may also be made to capturing a phase or purifying a phase or splitting a specimen into two or more phases.

Where in the present invention, reference is made to eluting a phase, reference may also be made to mobilising a phase, usually to remove it from the device.

The present invention relates to a microfluidic device for separating liquid phases. Reference may also be made to such a microfluidic device as a microfluidic trapping column. Separating of phases may be very advantageously used in the framework of liquid chromatography, although the invention is not restricted by this. According to embodiments of the present invention, a microfluidic device is described comprising a microfluidic trapping area for capturing the phase of interest. Hereby, it is an advantage of embodiments that a solution is provided whereby no valves need to be introduced at chip level, but that a simple solution is provided to provide a compact device for separating stages wherein no detrimental effects occur caused by dead volume in the system. Furthermore, with this simple solution, all functionality is still obtained for separating and subsequently eluting the phase.

In embodiments of the present invention, the microfluidic trapping area is on two sides, for example sides opposite each other, connected to a first duct and a second duct respectively, both integrated into the microfluidic device. The microfluidic device further comprises a first integrated input connected to the first duct, to take the specimen into the trapping area in which the phase of interest will be separated. It also comprises the first integrated output connected to the second duct, to discharge the rest of the specimen, after it has passed through the microfluidic trapping area and the phase of interest has immobilised.

The microfluidic device also comprises a second integrated output connected to a selected duct selected from the first duct or the second duct, to elute the separated phase from the device via this output, and a second integrated input connected to the first duct or the second duct that is not the selected duct, to connect to a pump to be able to pump the separated phase out of the device.

In addition, the microfluidic device also comprises a third integrated input, also connected to the selected duct via a connection located between the connection of the second integrated output on the selected duct and the microfluidic trapping area and via which the liquid flow during separating of the phase and eluting of the phase may be controlled.

As will be shown, the column for separating and eluting may be based on a unidirectional flow direction or on a bidirectional flow direction, i.e. whereby different (opposing) flow directions are used when separating the phase and eluting the separated phase.

Further characteristics and advantages of embodiments of the present invention will be described with reference to the figures. It should be noted here that the invention is not restricted to the specific embodiments shown in these figures or described in the examples, but is only limited by the claims.

Figure 1A:
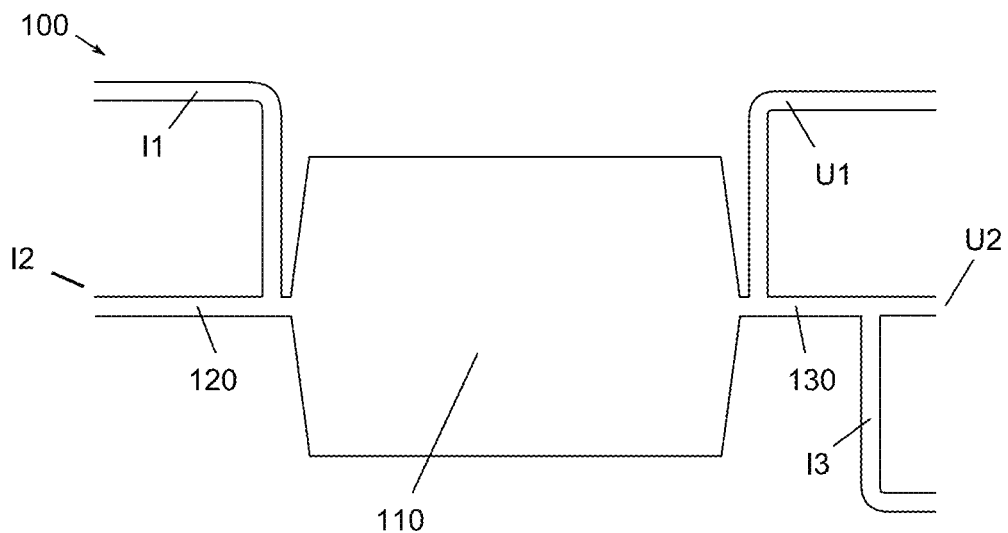
FIG. 1A and FIG. 1B show schematic representations of a microfluidic device with unidirectional or bidirectional flow respectively according to one embodiment of the present invention.

FIG. 1A shows a schematic representation of a microfluidic device 100 according to one embodiment of the present invention for separating a phase in a specimen. The microfluidic device comprises a microfluidic trapping area 110 for capturing the phase of interest. This microfluidic trapping area 110 may for example comprise a pillar structure, monolithic phase or packed material adapted to capture the phase of interest, as illustrated in FIG. 1A, but the present invention is not limited thereto. Trapping area 110 may typically have dimensions in the range of 1 mm to 50 mm in length, 0.1 mm to 50 mm in width and 1 μm to 2 mm in depth. Microfluidic trapping area 110 is integrated into a microfluidic chip that comprises the device or a large part thereof. Microfluidic device 100 is connected on two sides to respectively a first duct 120 and a second duct 130, both integrated in microfluidic device 100. A typical diameter of the first duct and/or the second duct is in the 10 μm to 500 μm range, or in the case of a square intersection, a width of 10 μm to 500 μm and a depth of 0.5 μm to 5000 μm (5 mm). Microfluidic device 100 shown in FIG. 1A further has a first integrated input I1, connected to first duct 120 and a first integrated output U1, connected to the second duct. Via this input and output, the specimen may be introduced into the trapping area to separate the phase of interest. While the phase of interest is immobilised into trapping area 110, the rest of the specimen is discharged. This may be to a rest container for example, although further handling, processing or treating of this part of the specimen still remain possible. Furthermore, microfluidic device 100 further comprises a second integrated output U2, connected to second duct 130, to elute the separated phase via this output. This eluting may comprise transporting of the separated phase to a detector, injecting of the separated phase into an analytical column, etc. (not shown in the figure). Microfluidic device 100 from FIG. 1A further typically comprises a second integrated input I2, connected to first duct 120, with which the phase to be eluted may be pumped. Second integrated input I2 may be connected or is connected to a pump (not shown in the figure) to be able to pump the separated phase out of the device, via second integrated output U2. This eluting may for example happen to a detector or to an analytical column. The flow direction for a device as shown in FIG. 1A is the same for separating and eluting, so that reference may be made to a device with unidirectional flow.

Furthermore, microfluidic device 100 from FIG. 1A comprises a third integrated input I3, which in addition to integrated output U2 is also connected to second duct 130. Third integrated input I3 is located between the connection of second integrated output U2 on two-duct 130 and microfluidic trapping area 110.

Microfluidic device 100 from FIG. 1A operates as follows: a specimen of which a phase of interest is to be separated or isolated, is taken to first integrated input I1. As this is connected to first duct 120, the specimen is taken to microfluidic trapping area 110. Here the phase of interest is separated. The rest of the specimen, without the separated phase, is then removed from microfluidic trapping area 110 via first integrated output U1. It is an advantage of embodiments of the invention that when loading and separating the specimen, no loss of specimen can occur via second integrated output U2. This is made impossible by the use of third integrated input I3, which during loading of the specimen and separating of the phase, is connected to a pump and generates counter-pressure in second duct 130 and so makes flow to second integrated output U2 impossible. As such, leaking of the specimen, for example to the detector or analytical column, is prevented, without using a physical shut-off valve in the microfluidic substrate. Once the rests of the separated specimen have been discharged via first integrated output U1, the phase that was captured or separated in microfluidic trapping area 110 will be pumped out of trapping area 110 via integrated output U2 by pumping via second integrated input I2, which on one side is connected to an analytical pump and on the other side is connected to first duct 120. Again, using third integrated input I3, the liquid flow is prevented from escaping via a parasite duct. More specifically is prevented, by connecting third integrated input I3 to the first integrated output in a circuit, that the separated phase would exit the device via the first integrated output instead of via the second integrated output. Particularly considering the often small quantity of the separated phase, it is important not to have any losses.

So the liquid flow may be controlled via third integrated input I3 during separating of the phase and injecting of the phase.

Figure 1B:
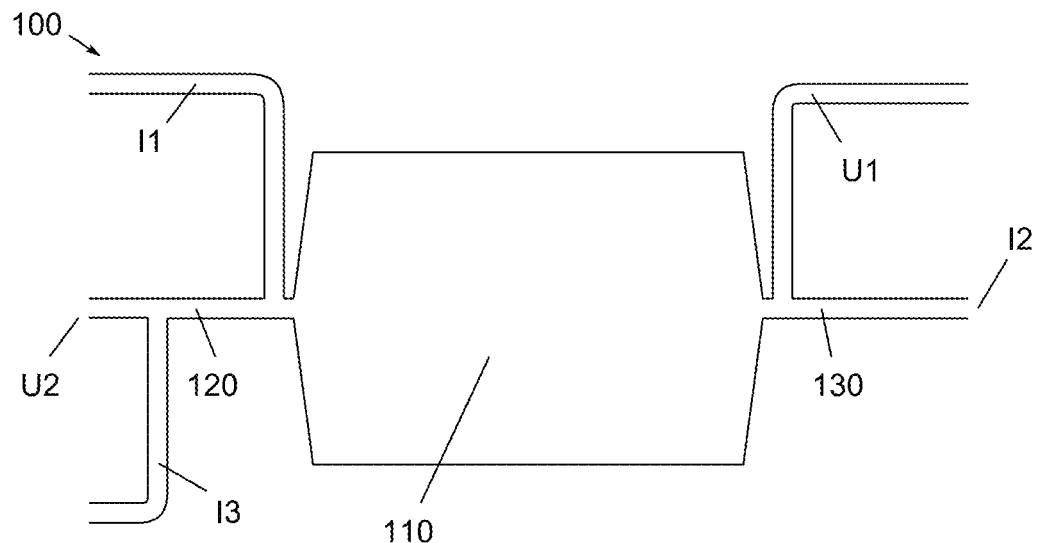

FIG. 1B shows a schematic representation of a microfluidic device 100 according to an alternative embodiment of the present invention. The difference with the microfluidic device shown in FIG. 1A is that the system is configured for bidirectional flow, whereby the flow directions in separating and eluting are therefore opposite. This microfluidic device 100 therefore comprises analogous components as described for the embodiment shown in FIG. 1A. In FIG. 1B, second integrated output U2 is however connected to first duct 120, instead of to the second duct. As a result, the corresponding integrated input is connected to second duct 130. This way, eluting of the captured phase may happen in opposing sense of flow compared with the sense of flow for loading the specimen. Here too, microfluidic device 100 from FIG. 1B comprises a third integrated input I3, which in addition to integrated output U2 is also connected to first duct 130. Third integrated input I3 is located between the connection of second integrated output U2 on first duct 130 and microfluidic trapping area 110.

Microfluidic device 100 from FIG. 1B operates as follows: a specimen of which a phase of interest is to be separated, is taken to first integrated input I1. As this is connected to first duct 120, the specimen is taken to microfluidic trapping area 110. Here the phase of interest is separated. The rest of the specimen, without the separated phase of interest, is then removed from microfluidic trapping area 110 via first integrated output U1. By generating a pressure via third integrated input I3 is prevented that the specimen flows via second integrated output U2 instead of the trapping area. Once the rests of the separated specimen have been discharged via first integrated output U1, the phase that was captured or separated in microfluidic trapping area 110 will be pumped out of trapping area 110 via second integrated input I2, which is connected to an analytical pump and is connected to second duct 130. By connecting third integrated input I3 to first integrated input I1 in a circuit, loss via first integrated input I1 is prevented when eluting. So the liquid flow may be controlled here too via third integrated input I3 during separating of the phase and injecting of the phase.

Microfluidic devices 100 from FIGS. 1A and 1B do not make use of integrated valves. Furthermore, as the input and output elements are integrated, they ensure compact microfluidic devices. Although valves are used to make the various connections, for example from inputs to the pump or for creating a circuit between inputs and/or outputs among each other, the specific configuration of the device together with the fact that the valves are external to the device and not in the direct path of elution of the phase before it, ensures that there is no dead volume and so no loss of separated phase, nor associated dispersion of the eluted plug. In other words, a compact device for accurately separating a phase is achieved.

Figure 1C:
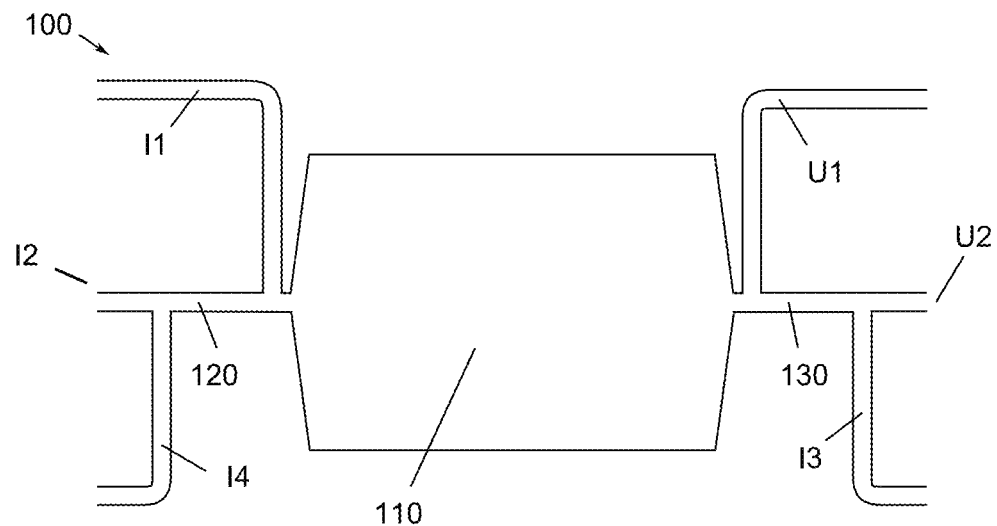
FIG. 1C shows a schematic representation of a microfluidic device in which an additional integrated input is provided, according to one embodiment of the present invention.

As an example, microfluidic device 100 from FIG. 1C is further also shown. Herein a further additional integrated access is provided. This may for example allow to prevent loss of specimen to the second integrated input by generating, when loading the specimen, a pressure in the first duct between the first and the second integrated accesses. More generally it should be noted that the device according to embodiments of the present invention, in addition to the inputs and outputs shown, other additional inputs and outputs may be provided and that, according to the idea of the further third integrated input in the preceding examples, there may be further inputs to control the flow in the other additional inputs and outputs.

As a further illustration, not restricting embodiments hereto, schematic representations of microfluidic devices according to specific implementations of exemplary embodiments are shown in the following figures. Examples are given whereby use is made of external six-way valves and/or ten-way valves. It should be noted that these are just some examples, whereby these external valves may of course be implemented differently, whereby a six-way valve may for example be replaced by two correctly configured three-way valves.

In a first explicit implementation, a microfluidic device is shown which makes use of two six-port valves and one ten-port valve. FIG. 2A to FIG. 2C schematically illustrate the configurations for the valves and the associated configuration of the microfluidic device for loading the specimen, separating and eluting respectively. Microfluidic device 100 is coupled to a first six-port valve for injection 210, a second six-port valve for column 220 and a ten-port valve for column 230. Various positions of the multi-port valves result in various interconnections of the ports so that various configurations may be implemented between the inputs and outputs of the device between them and/or of these inputs and outputs and pumps.

FIG. 2A indicates the position of the valves during loading of the specimen. Here, loading of the specimen happens in one of six-port valves 210, separately from the device. The specimen is taken into the valve in injection loop 240, so that, afterwards, it may efficiently be introduced into the device for separating. For this, use is made of injection needle 242 for example and a further injection valve 244, although other means are possible too.

The embodiment described in FIG. 2A operates as follows to load a specimen: the specimen is injected via port 6 into first multi-port valve 210 by making use of an injection needle 242. The specimen then flows away through the path between valves 5, 6, 3, 4 and will be loaded into injection loop 240.

Once the specimen is loaded into injection loop 240, the first, second and third multi-port valves will be adjusted, manually or automatically, so that the specimen may be taken to inside trapping area 110 and the phase of interest may be separated. FIG. 2B illustrates the position of the valves during separating of the phase. In this phase, injection loop 240 is connected to a loading pump 250 and, via ports on the ten-way valve, to trapping area 110. To a second side, trapping area 110 is connected to other ports of ten-port valve 230. As such, a path is formed between first pump 250, e.g. the loading pump, injection loop 240 and trapping area 110 allowing the specimen to flow to trapping area 110 using the loading pump. Furthermore, a further path is formed from the first output of the trapping area to output duct 270. The ports of the third multi-port valve provide the connection to the third integrated input, which ensures that the specimen does not pass to analytical column 140 which is already also connected to trapping area 110. For this, port 1 of the third multi-port valve is connected to a pump or pressure valve or pressure tank 280 and on the other side connected to the third integrated input via port 6. It should be noted that analytical column 140 may also be integrated in the same microfluidic substrate as the trapping area. Analytical column 140 may then also be permanently connected to trapping area 110.

The embodiment described in FIG. 2B operates as follows to separate a specimen: the specimen that is in injection loop 240 is taken to the first duct by loading pump 250. When the specimen is pumped to the entrance or the first duct, the pump, pressure valve or pressure tank 280 connected to the third integrated input in a pressure generation in the first duct foresees that the specimen cannot flow to the detector or analytical column 140. After the specimen has passed through trapping area 110 and its phase has therefore been separated, the waste or rests of the specimen are discharged via the path formed by the connection between the second duct and the second multi-port valve. The configuration ensures a zero-dead-volume connection with active anti-blockage action between trapping area 110 and analytical column 140.

Now the phase is separated, this phase must typically be taken out of the device, for example to a detector or an analytical column. For this, liquid will be injected into the trapping area, the separated phase will be mobilised and passed to the detector or analytical column.

FIG. 2C shows the position of the valves when eluting, for example to a detector or an analytical column. For this, a pump 260, called micro-pump or analytical pump in the example, is connected to the second duct and to trapping area 110 via ten-point-valve 230. The separated phase will then be mobilised to trapping area 110 and taken to analytical column 140 via the second integrated output (in the current example). The other inputs and outputs are coupled to a stop via remaining ports on the ten-port valve and the six-port valve so no flow is possible and no phase can leak into these ducts. Loading pump 250 is connected to a rest-output 252

FIG. 3A to 3C illustrate a schematic representation of a second specific example of a microfluidic device using three six-port valves. In this example, loading and separating happens similarly as described in the first explicit example. During eluting, shown in FIG. 3C, however, instead of making use of stops, the first integrated input and the third integrated input are connected together in a circuit via one of the six-port valves, so that no flow is possible here either. This also results in the fact that no phase can leak.

FIG. 4A to 4C illustrate a schematic representation of a third specific example of a microfluidic device using one six-way valve and one ten-way valve. The various ports are optimally configured here to get a same effective configuration as described in the second specific example.

In a second aspect, the present invention also relates to a chromatography system comprising a device as described in the first aspect and an analytical column connected to the device and via which a specific phase from the specimen may be injected into the analytical column. Further components of the chromatography system may be as in chromatography systems known in the state of the art. Characteristics and advantages of the current chromatography system correspond with the characteristics and advantages provided in the description of embodiments of the microfluidic device from the first aspect.

In a third aspect, the present invention also relates to the use of a microfluidic device according to one of the embodiments from the first aspect as a stationary phase in a chromatography procedure.

In a fourth aspect, the present invention relates to a method for operating a microfluidic device for separating a phase in a specimen. The microfluidic device corresponds thereby with a microfluidic device as described in embodiments from the first aspect. The method comprises trapping of a phase in the microfluidic trapping area by input via the first integrated input and an output via the first integrated output, whereby a counter-pressure is provided in the channel onto which the second integrated output (U2) is coupled to prevent eluting of the specimen. The method also comprises eluting of the separated phase by pumping via the second integrated input and to the second integrated output whereby loss of the separated phase via the first integrated input or the first integrated output is prevented by closing the first integrated input or the first integrated output in a circuit using the third integrated input. The method may also comprise controlling of a pump system connected to at least two inputs so that the device in operating mode is flowed through bidirectionally. The speeds of the flow in the various flow directions may also be controlled. Further method steps may correspond with the functionality of the various characteristics of the device as described in the first aspect.

In one aspect, the present invention relates to a microfluidic device for analysing a specimen, the microfluidic device comprising a loading area for loading the specimen of interest And an analytical column, whereby the loading area is connected on two sides to a first duct and a second duct respectively, both integrated in the microfluidic device, and whereby the microfluidic device further comprises a first integrated input connected to the first duct to take the specimen into the loading area, comprises a first integrated output connected to the second duct to discharge the rest of the specimen, once it has flown through the loading area has a second integrated output connected downstream the analytical column of the device characterised in that the first integrated output is arranged for during a first loading period of time being in circuit connected to the first integrated input so as to load the sample into the loading zone of the device while preventing loss of specimen during loading of the sample into the loading zone. It is an advantage of embodiments of the present invention that the loading cycle can be kept short. For example, the system can be provided with a limited number of channels in a loading zone which can be used for loading with a high flow rate.

The speed at which loading In the loading zone can be performed is between 0.1 and 1000 µl/min.

It is an advantage of at least some embodiments that when eluting to a detector or to an analytical column from a loading zone, the specimen does no longer need to pass a valve.

Figure 5:
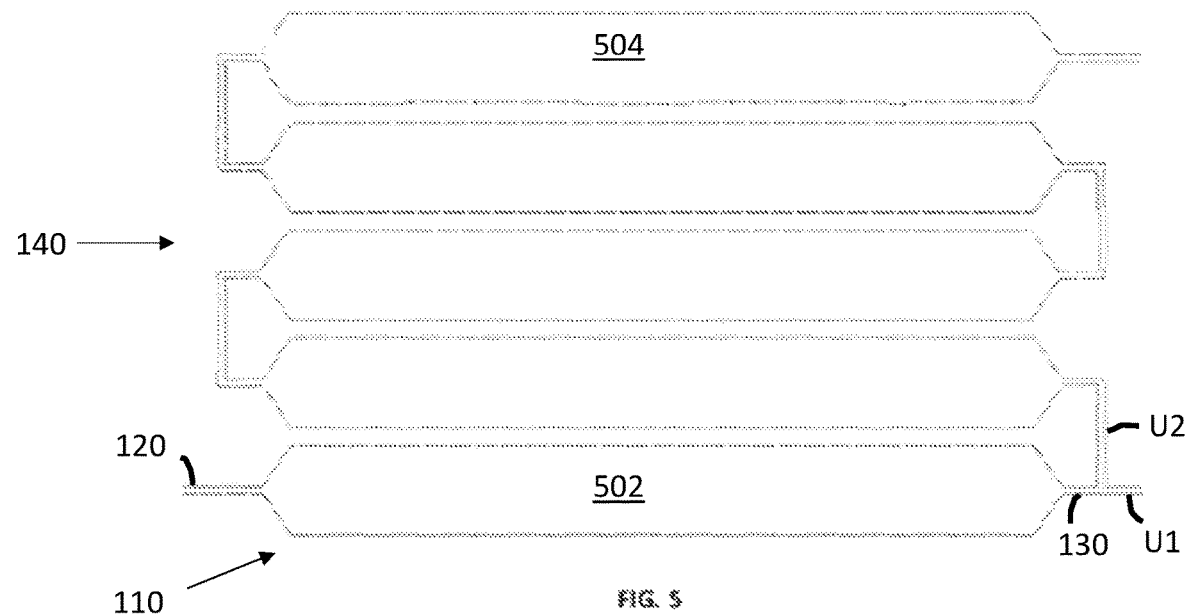
Figure 6:
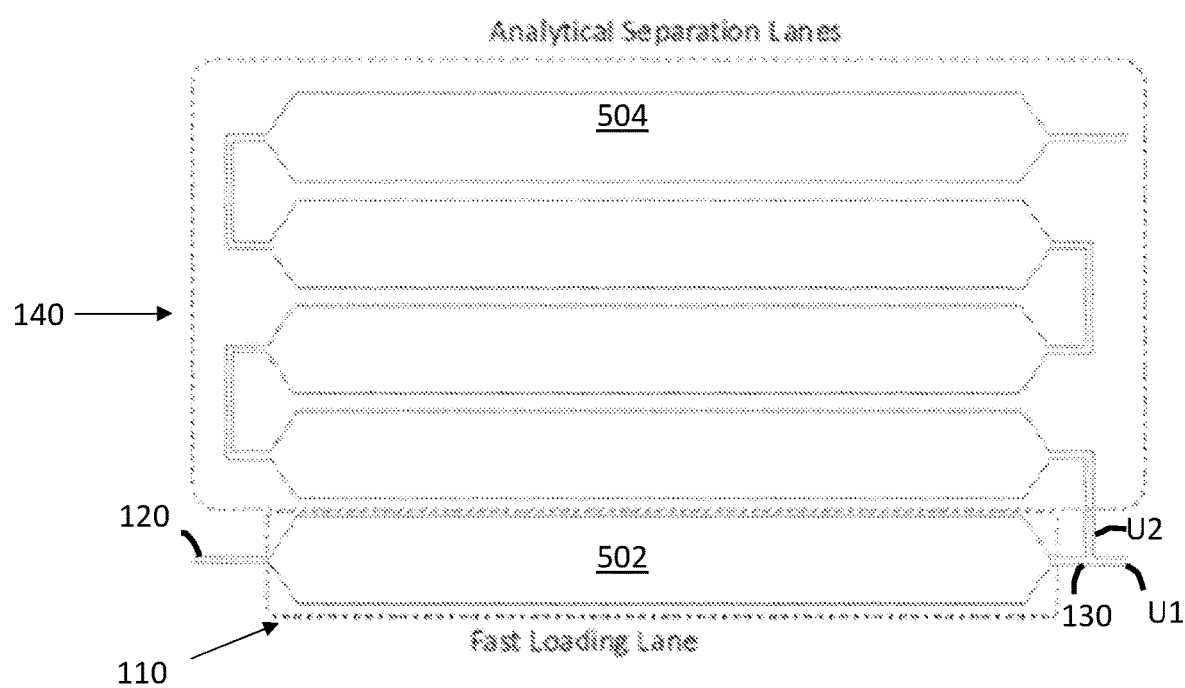
Figure 7:
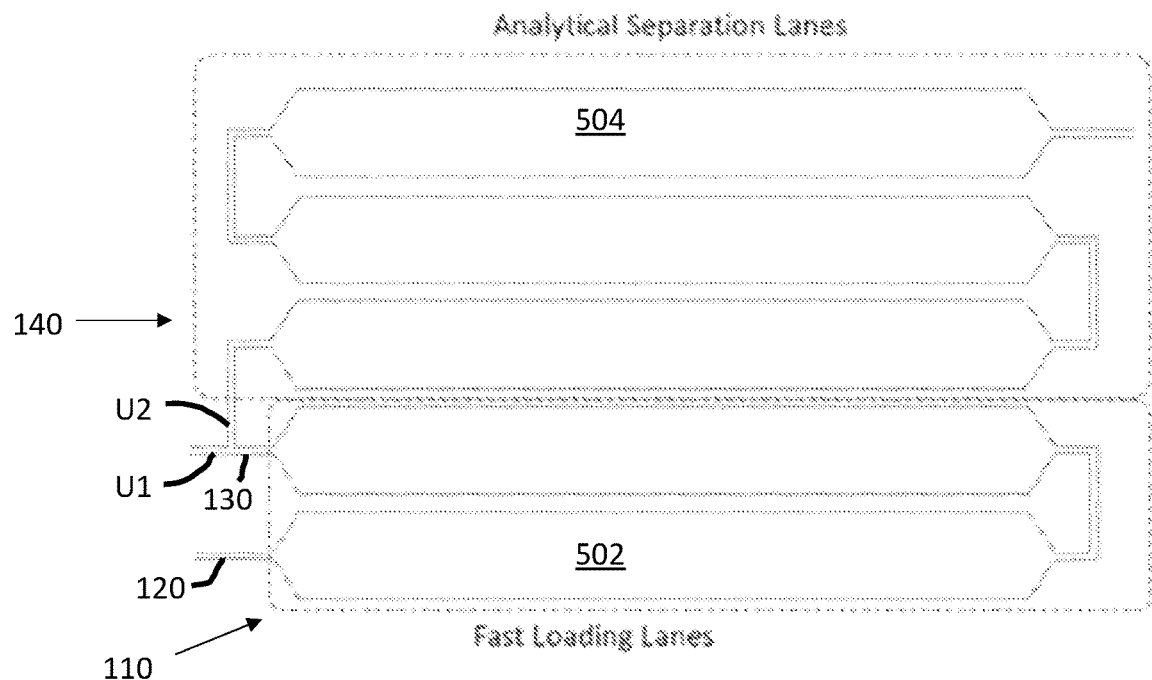

FIGS. 5 to 7 illustrates a plurality of different embodiments of a microfluidic device according to the present invention.

FIGS. 5-7, 8, 9, 10a-10c, 11 and 12 include elements previously described. These include the trapping area 110, the first duct 120, the second duct 120, the first integrated output U1, the second integrated output U2, the analytical column 140, the waste collector 1004 the loading channel 502, and the separation channel 504.

Figure 8:
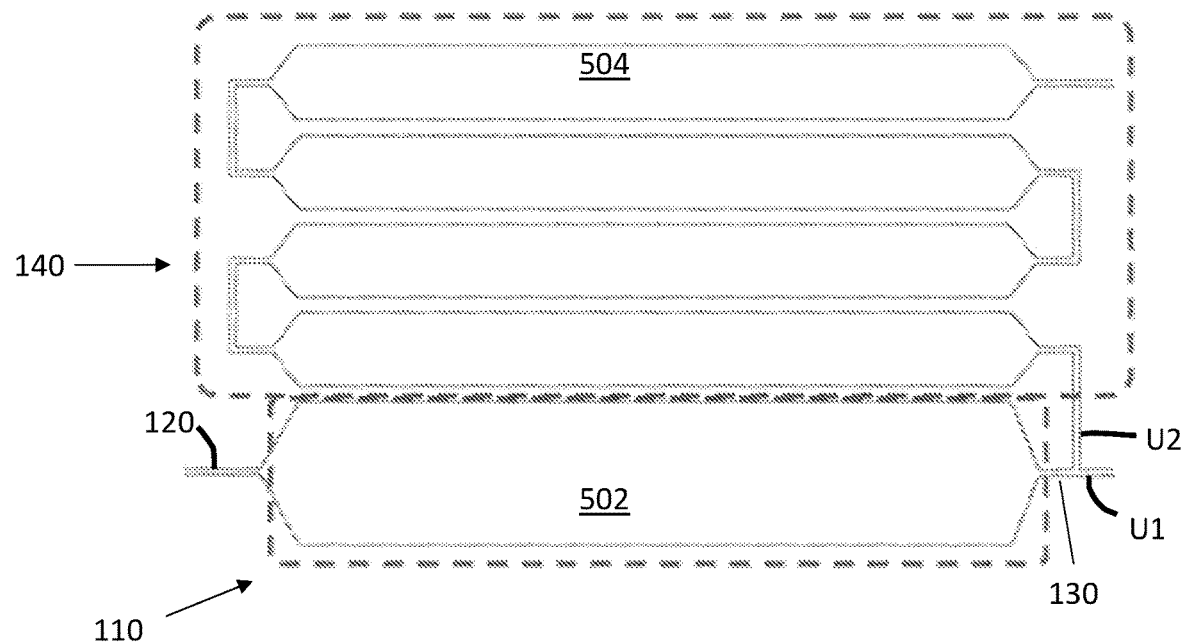

FIG. 8 illustrates a microfluidic device wherein the one or more lanes of the trapping area 110 loading zone have a larger width then the mean width of the analytical column separation channel 504. The latter assists in avoiding that the sample, during loading, automatically flows into the analytical column. It does provide a pressure controlled during flowing.

Figure 9:
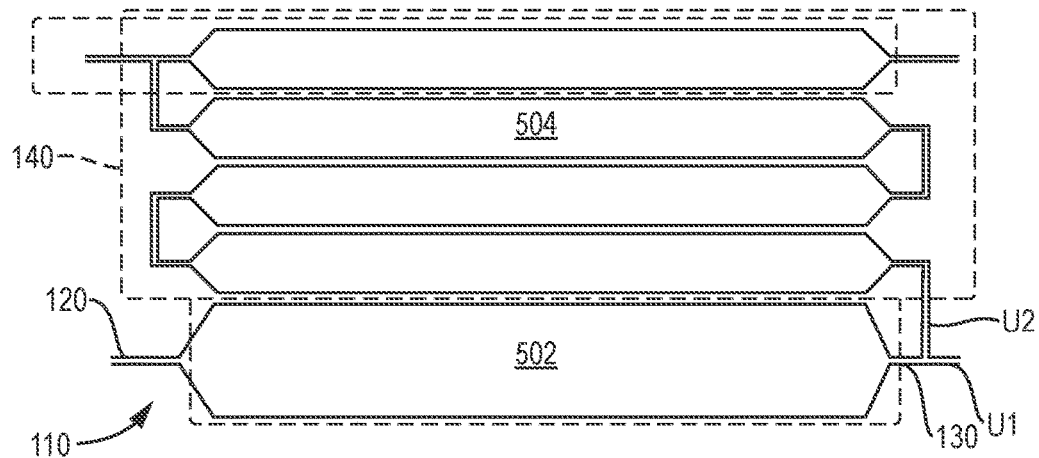

FIG. 9 Illustrates a similar microfluidic device version and additional lane for adding a work up solvent at the output of the analytical column 140 is shown. The latter assists in the higher sensitivity e.g. during the detection of the analyte.

In FIG. 10a to FIG. 10c illustrate a system comprising a microfluidic device according to an embodiment of the present invention. The microfluidic device is connected to a 10-way valve.

FIG. 10a illustrates a system wherein sample loading to a trapping column is performed. Such sample loading can be performed quickly. If more sample is provided than can be equipped by the trapping column, this is guided to a waste.

FIG. 10b illustrates the same system during the sample transfer to the analytical column 140. This is a further loading process to a trapping area 110 just prior to e.g. an analytical column. This trapping area may for example comprise one or more fast loading channels.

FIG. 10c illustrates providing the sample in the analytical column using an analytical pump and eluting while at the same time also a new loading cycle can be performed.

FIG. 11 illustrates a similar setup wherein the output of the analytical column 140 is combined to provide an additional work-up solvent for enhancing the sensitivity in actions after the analytical column. A T-piece is therefor used. The flow of the work up solvent can be controlled via an auxiliary flow manager.

Alternatively to positioning the T-piece at the end of the analytical column, as shown in FIG. 12 one or more additional lanes can be used for adding the work of solvent for obtaining the enhanced sensitivity.

The preceding description gives details of certain embodiments of the invention. It will, however, be clear that no matter how detailed the above turns out to be in text, the invention may be applied in many ways. It should be noted that the use of certain terminology when describing certain characteristics or aspects of the invention should not be interpreted as implying that the terminology herein is defined again to be restricted to specific characteristics or aspects of the invention to which this terminology is coupled.

The invention claimed is:

1. A microfluidic device for analyzing a specimen, the microfluidic device comprising:
   an analytical column;
   a trapping area for loading the specimen, the trapping area being connected on two sides to a first duct and a second duct respectively, both integrated in the microfluidic device;
   a first integrated output connected to the second duct to discharge a portion of the specimen, once the specimen has flowed through the trapping area; and
   a second integrated output connected to the analytical column;
   wherein the first integrated output is connected to the first duct during a first period of time so as to load the specimen into the trapping area of the device while preventing loss of the specimen during loading of the specimen into the trapping area.

2. The microfluidic device according to claim 1, wherein the plurality of separation channels of the analytical column are oriented substantially parallel to each other.

3. The microfluidic according to claim 1, wherein the second integrated output is connected to a spray tip.

4. The microfluidic device according to claim 1, wherein a linear flow velocity in the system is controllable by a pump system.

5. The microfluidic device according to claim 1, the device comprising a pump system, the pump system comprising a pump for loading the specimen via the first duct and an analytical pump for pumping the specimen to the analytical column.

6. The microfluidic device according to claim 1, wherein the device is arranged for receiving the specimen to the trapping area at a flow rate in the range 0.1 µl/min to 1000 µl/min.

7. The microfluidic device according to claim 1, wherein external connections to the first duct and the first integrated output are implemented by at least one six-way valve.

8. The microfluidic device according to claim 1, wherein external connections to the first duct and the first integrated output are implemented using at least a valve with more than 6 ports.

9. The microfluidic device according to claim 1, wherein external connection to the first duct and the first integrated output are implemented by at least one ten-way valve.

10. The microfluidic device according to claim 1, wherein the device comprises a waste collector for collecting the portion of the specimen discharged via the first integrated output.

11. The microfluidic device according to claim 1, wherein the device furthermore is arranged during a second period of time, having the first integrated output being connected to a blind stop and having the first duct being connected to the second integrated output so as to drive the specimen from the trapping area into the analytical column thus preventing loss of the specimen via the first integrated output during an analytical separation of the specimen in the analytical column.

12. The microfluidic device according to claim 11, wherein the device is arranged for providing a flow rate during the first period of time at least 2 times the flow rate during the second period of time.

13. The microfluidic device according to claim 1, wherein the trapping area comprises one or more loading channels and wherein the analytical column comprises a plurality of separation channels.

14. The microfluidic device according to claim 13, wherein the one or more loading channels are oriented substantially parallel to each other.

15. The microfluidic device according to claim 13, wherein one or more of the loading channels has a larger width than the width of one or more of the separation channels of the analytical column.

16. A chromatography system, wherein the system comprises a microfluidic device according to claim 1.

17. A method for separating a specimen using the microfluidic device according to claim 1, the method comprising:
loading the specimen into the trapping area;
discharging the portion of the specimen, once it has flowed through the trapping area, while preventing loss of specimen during loading of the specimen into the analytical column;
guiding the specimen to the analytical column of the device so as to load the sample specimen into the analytical column of the device.

18. The method according to claim 17, comprising controlling of a pump system so as to vary the flow velocity between a velocity during loading in the trapping area and a velocity during said loading into the analytical column.

* * * * *